(12) United States Patent
Hammerschmidt

(10) Patent No.: US 8,849,520 B2
(45) Date of Patent: Sep. 30, 2014

(54) SENSOR INTERFACE TRANSCEIVER

(75) Inventor: Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 13/430,015

(22) Filed: Mar. 26, 2012

(65) Prior Publication Data

US 2013/0253774 A1 Sep. 26, 2013

(51) Int. Cl.
*B60R 21/00* (2006.01)

(52) U.S. Cl.
USPC .............. 701/45; 701/29.8; 701/500; 702/57; 702/62; 702/65; 702/87; 73/771; 73/146.3; 73/500

(58) Field of Classification Search
CPC  B60R 21/0132; B60R 21/015; B60R 21/013; B60R 21/0134; B60R 2021/01516
USPC .................. 323/209, 285, 318; 324/166, 173, 324/207.12, 207.13, 601, 655; 340/442, 340/517, 540; 326/30, 31, 81, 87; 327/108, 327/308, 554; 356/5.1
See application file for complete search history.

(56) References Cited

U.S. PATENT DOCUMENTS

| | | | |
|---|---|---|---|
| 3,761,841 A | 9/1973 | Jacquart | |
| 5,550,498 A | 8/1996 | Kwan et al. | |
| 6,064,327 A | 5/2000 | Ryoho et al. | |
| 6,362,702 B1 | 3/2002 | Nielsen et al. | |
| 6,556,144 B1 | 4/2003 | Roberts et al. | |
| 6,608,566 B1 | 8/2003 | Davis | |
| 8,497,712 B2 | 7/2013 | Nguyen et al. | |
| 8,710,963 B2 | 4/2014 | Hammerschmidt | |
| 2003/0023328 A1 | 1/2003 | Yasui | |
| 2007/0108953 A1 | 5/2007 | Latham | |
| 2008/0123815 A1* | 5/2008 | Feda | 378/112 |
| 2008/0300750 A1 | 12/2008 | Davis et al. | |
| 2008/0310200 A1 | 12/2008 | Maksimovic et al. | |

(Continued)

FOREIGN PATENT DOCUMENTS

| | | |
|---|---|---|
| CN | 101806602 A | 8/2010 |
| DE | 3912439 A1 | 10/1990 |

(Continued)

OTHER PUBLICATIONS

U.S. Appl. No. 13/046,891, filed Mar. 14, 2011. 35 Pages.

(Continued)

*Primary Examiner* — Helal A Algahaim
*Assistant Examiner* — Jelani Smith
(74) *Attorney, Agent, or Firm* — Eschweiler & Associates, LLC

(57) ABSTRACT

Some embodiments of the present disclosure relate to a sensor interface module that selectively varies the resistance of an RLC network based upon one or more properties of exchanges data signals between one or more sensors and a controller (e.g., an ECU). The disclosed sensor interface module has a closed control loop that receives modulated sensor current signals from one or more sensors and that regulates a modulated output voltage that is provided to the one or more sensors. A protocol processor detects one or more properties of the exchanged voltage and current signals. The protocol processor provides the detected properties to an impedance controller, which selectively varies the value of an impedance element within an RLC network, located between the sensor interface module and the one or more sensor, to adjust the one or more properties in a manner that improves performance of the sensor interface module.

20 Claims, 10 Drawing Sheets

(56) References Cited

U.S. PATENT DOCUMENTS

| | | | |
|---|---|---|---|
| 2009/0076760 A1* | 3/2009 | Schumacher et al. | 702/104 |
| 2009/0205436 A1* | 8/2009 | Garverick et al. | 73/777 |
| 2009/0237282 A1 | 9/2009 | Hartlieb et al. | |
| 2009/0241499 A1 | 10/2009 | Maertens et al. | |
| 2009/0302815 A1 | 12/2009 | Tanzawa | |
| 2009/0319060 A1 | 12/2009 | Wojsznis et al. | |
| 2011/0309916 A1 | 12/2011 | Mueller et al. | |
| 2012/0056642 A1* | 3/2012 | Song et al. | 326/30 |
| 2012/0081085 A1 | 4/2012 | Miyamae | |
| 2012/0101595 A1* | 4/2012 | Jung et al. | 623/25 |
| 2012/0153917 A1 | 6/2012 | Adell et al. | |
| 2012/0249093 A1 | 10/2012 | Grbo et al. | |
| 2012/0307229 A1* | 12/2012 | Conroy et al. | 356/5.1 |
| 2013/0033357 A1 | 2/2013 | Hammerschmidt | |
| 2013/0043908 A1 | 2/2013 | Hammerschmidt | |
| 2013/0063166 A1* | 3/2013 | Ng et al. | 324/682 |
| 2013/0229197 A1 | 9/2013 | Kusaka et al. | |
| 2014/0077982 A1 | 3/2014 | Wu et al. | |

FOREIGN PATENT DOCUMENTS

| | | |
|---|---|---|
| DE | 4228047 A1 | 4/1993 |
| DE | 10340431 A1 | 4/2004 |
| DE | 102008041030 A1 | 2/2010 |

OTHER PUBLICATIONS

Dahono, Pekik Argo. "A Control Method for DC-DC Converter That Has an LCL Output Filter Based on New Virtual Capacitor and Resistor Concepts." 2004 35th Annual IEEE Power Elecfronics Specialists Conference. 7 Pages.

DSI3 Bus Standard. Jul. 2, 2010. 46 Pages.

PSI5 Peripheral Sensor Interface. Peripheral Sensor Interface for Automotive Applications. 47 Pages.

Wessels, Christian, et al. "Active Damping of LCL-Filter Resonance based on Virtual Resistor for PWM Rectifiers—Stability Analysis with Different Filter Parameters." Insitute of Power Electronics and Electrical Drives Kaiserstr. 2, 24143 Kiel, Germany. 7 Pages.

U.S. Appl. No. 13/197,288, filed Aug. 3, 2011. 22 Pages.

U.S. Appl. No. 13/212,463, filed Aug. 18, 2011. 23 Pages.

Infineon Technologies. "Differential Two-Wire Hall Effect Sensor IC." Published in Feb. 2002. 18 Pages.

Discrete Semiconductors. "Rotational Speed Sensor for Extended Air Gap Application and Direction Detection." Published on Sep. 4, 2004. 16 Pages.

Infineon Technologies. "TLE4941/4941C Smart Hall Effect ICs for Active Wheel Speed Sensing." Published in 2006. 2 Pages.

U.S. Appl. No. 13/908,389, filed Jun. 3, 2013. 47 Pages.

Micrel : MIC 184 Local/Remote Thermal Supervisor. Firmenschrift, Micrel, Inc. : Data Sheet MIC184, May 2006. San Jose: Micrel, 2006. 20 Pages.

Hägglund, Tore : New Estimation Techniques for Adaptive Control. Doctoral Dissertation, The Swedish Board for Technical Development (STU), Document No. : CODEN : LUTFD2/(TFRT-1025)/1-120/(1983). Lund, Sweden : Lund University, Department of Automatic Control, Dec. 1983. 118 Pages.

Tietze, U. et al. "Electronic Circuits: Design and Applications." ISBN 3-540-50608-X. Berlin, Heidelberg ; New York : Springer. Kapitel 23.6-23.8 : AD-Umsetzer, S. Published in 1991. pp. 690-711.

Office Action dated Jun. 26, 2013 for U.S. Appl. No. 13/046,891.

Notice of Allowance dated Dec. 16, 2013 for U.S. Appl. No. 13/046,891. 24 Pages.

U.S. Appl. No. 14/248,668, filed Apr. 9, 2014.

Office Action Dated Jun. 20, 2014 U.S. Appl. No. 13/197,288.

Non Final Office Action Dated Jul. 16, 2014 U.S. Appl. No. 13/212,463.

\* cited by examiner

| Required slew rate | Feedback | Conclusion |
|---|---|---|
| $dV_{ref}/dt > 0$ | $V_{ref} > V_{out}$ | decrease $R_{svirt}$ |
| $dV_{ref}/dt > 0$ | $V_{ref} < V_{out}$ | increase $R_{svirt}$ |
| $dV_{ref}/dt < 0$ | $V_{ref} < V_{out}$ | decrease $R_{svirt}$ |
| $dV_{ref}/dt < 0$ | $V_{ref} > V_{out}$ | increase $R_{svirt}$ |

US 8,849,520 B2

SENSOR INTERFACE TRANSCEIVER

BACKGROUND

Modern vehicles include a vast array of sensors, such as air bag sensors, tire pressure sensors, engine sensors, seat belt sensors, and many others. The air bag sensors, for example, provide data about the vehicle's operation (e.g., wheel speed, deceleration, etc.) to an airbag control unit (ACU). Based on the data received from the air bag sensors, the ACU can determine when air bags within a vehicle should be deployed.

As the number of vehicular sensors increases, integration is becoming a serious challenge for automakers. For example, wires connecting an ACU to its corresponding air bag sensors can be several meters long. These wires are a significant cost factor in automotive systems and contribute to the overall weight of the vehicle. Because of this, some conventional wiring interfaces, such as PSI5 and DSI for example, limit the number of wires to two lines. Unfortunately, absent countermeasures, the inductances and capacitances of these wires can give rise to noise at a resonant frequency set by the inductances and capacitances of the wires.

In some conventional implementations, an RLC filter (which includes a resistor and an optional by-pass inductor in parallel with the resistor) may be arranged between an ECU (e.g., an electronic control unit such as an engine control unit) and its corresponding sensors. This RLC filter can be designed to attenuate noise at the resonant frequency, thereby helping to improve the performance of the vehicular sensing system.

DESCRIPTION OF THE DRAWINGS

FIG. 4a is a graph showing how slew rate enhancement changes the output voltage of an interface module compared to a reference voltage value.

FIG. 4b is a table illustrating states and resulting reactions of the slew rate enhancement mechanism shown in FIG. 4a.

DETAILED DESCRIPTION

Figure 1A:
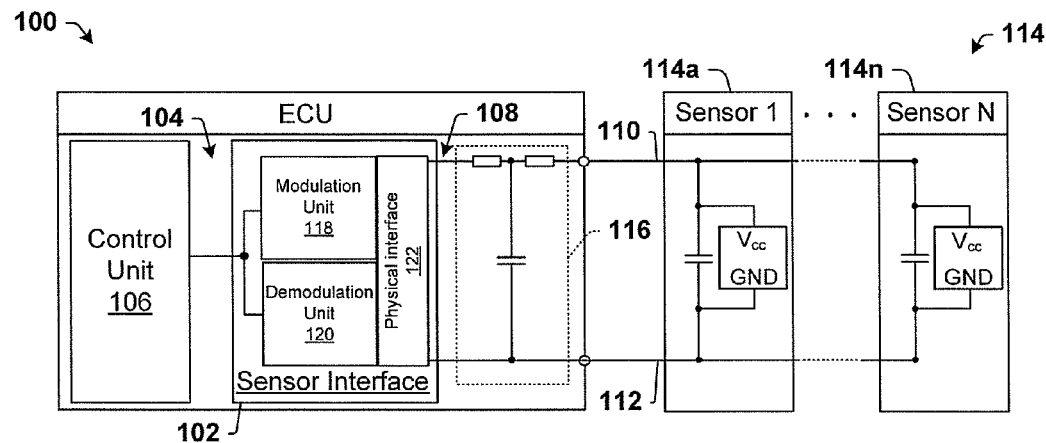
FIG. 1a is a block diagram of a vehicular sensing system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

To better appreciate some aspects of the present disclosure, FIG. 1a shows a vehicular sensing system 100 including a sensor interface module 102. The sensor interface module 102 has a control unit interface 104 coupled to a control unit 106 (e.g., ECU) and a sensor interface 108 coupled to a pair of wires 110, 112 that are connected to a number of sensors 114 (e.g., 114a, . . . 114n). To limit noise and attenuate the line resonance, an RLC network 116 is coupled to the sensor interface 108.

Figure 1B:
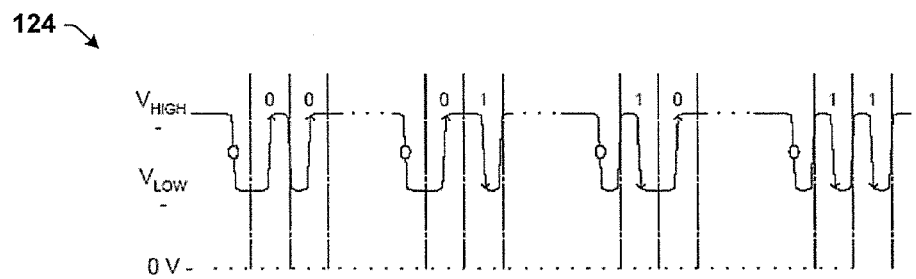
FIG. 1b is a waveform diagram of a modulated output voltage signal that can be transmitted to sensors of a vehicular sensing system.

To transmit information to the sensors 114, the sensor interface module 102 includes a modulation unit 118, which modulates a supply voltage (e.g., a change in the DC supply voltage) to transmit information to at least one of the sensors 114. FIG. 1b shows one example of how the modulation unit 118 can transmit a modulated output voltage signal 124 to a sensor by varying a control voltage between a high supply voltage ($V_{HIGH}$) and a low supply voltage ($V_{LOW}$). In FIG. 1b's example, a rising edge voltage transition corresponds to a logical "0" and a falling edge voltage transition corresponds to a logical "1", although other encoding schemes could also be used. When data is not transmitted, the modulation unit 118 often provides an un-modulated (e.g., DC) supply voltage to the sensors 114.

To receive information from the sensors 114, the sensor interface includes a demodulation unit 120, which demodulates a modulated sensor current signal to receive information from at least one of the sensors 114. A physical interface layer 122 may be positioned between the modulation and demodulation units, 118 and 120, and wires 110 and 112 in order to allow for a current measurement to be made by the demodulation unit 120, which is connected in parallel to the modulation unit 118.

Figure 1C:
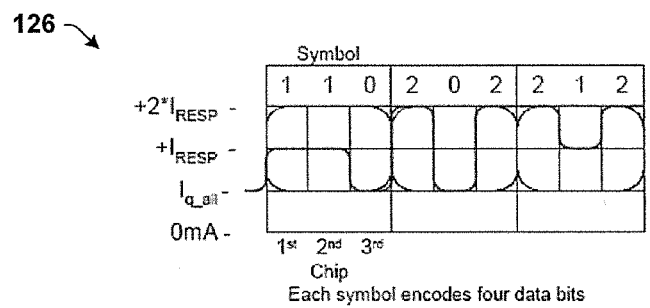
FIG. 1c is a waveform diagram of a modulated sensor current signal that can be transmitted from a sensor of a vehicular sensing system.

FIG. 1c shows one example of how a demodulation unit (e.g., demodulation unit 120 in FIG. 1) can evaluate a modulated sensor current signal 126 to decode information transmitted by a sensor. In FIG. 1c's example, data bits can be encoded as symbols on the modulated sensor current signal 126, wherein each symbol is made up of three chips and encodes four data bits. The demodulation unit 120 can digitally sample the modulated sensor current signal 126 to discern which of the symbols has been transmitted within a given symbol period, thereby decoding the digital bitstream transmitted by the sensor.

The present disclosure improves the performance of a sensor interface module that exchanges data signals between one or more sensors and a control unit (e.g., an ECU) by selectively varying the resistance of an RLC network. In some embodiments, the disclosed sensor interface module comprises a closed control loop configured to receive modulated sensor current signals from one or more sensors and to regulate a modulated output voltage that is provided to the one or more sensors. A protocol processor is configured to detect one or more properties of the exchanged voltage and current signals. The protocol processor provides the one or more detected properties to an impedance controller configured to selectively vary the value of an impedance element (e.g., comprising a real resistor or a control loop configured to implement a behavior that makes the output voltage behave similar as it would if there were a resistor) within an RLC network (e.g., comprising the bus wires and blocking capacitors) located between the sensor interface module and the one or more sensors, to adjust the one or more properties in a manner that improves performance of the sensor interface module.

Figure 2:
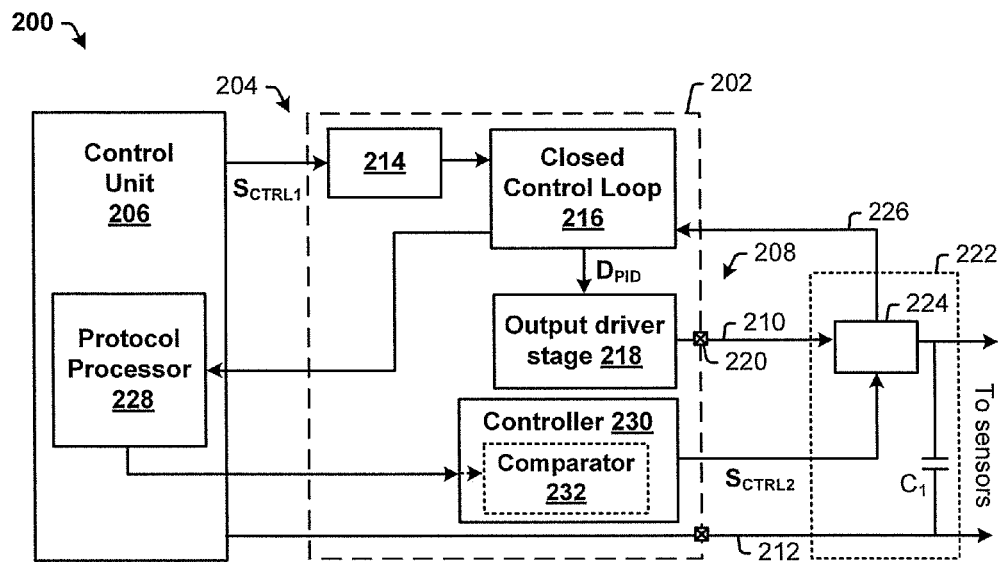
FIG. 2 is a block diagram of a sensor interface module in accordance with some embodiments.

FIG. 2 illustrates a block diagram of some embodiments of an ECU architecture 200 (e.g., an ACU) having a sensor interface module 202 configured to exchange data signals between one or more sensors and a control unit 206 (e.g., an ECU)

The sensor interface module 202 comprises a control unit interface 204 that interfaces to the control unit 206 and a sensor interface 208 that interfaces to the pair of wires 210, 212 coupled to one or more sensors. The sensor interface module 202 further comprises a reference voltage source 214 configured to receive a first control signal $S_{CTRL1}$ from control unit 206 and to generate a modulated reference signal based thereupon. The reference voltage source 214 is coupled to a closed control loop 216, which generates a digital signal $D_{PID}$ that is provided to a control terminal of an output driver stage 218. The digital signal $D_{PID}$ drives output driver stage 218 to regulate an output voltage at output node 220.

An RLC network 222, located between the sensor interface 208 and the one or more sensors, is configured to dampen the resonance between the line inductance and capacitors on the sensor side as well as on the ECU side. It will be appreciated that the disclosed RLC network 222 does not have to contain a resistor, capacitor, and inductor but instead in various embodiments may comprise one or more of a variable impedance element 224, a capacitive element, and/or an inductive element (e.g., an emulated inductor in parallel with the impedance element). In some embodiments, the variable impedance element 224 comprises a physical resistor, while in other embodiments the variable impedance element 224 comprises a virtual resistor (described below).

During operation, the sensor interface module 202 is configured to exchange data signals with one or more sensors. In particular, the closed control loop 216 can change the output voltage at output node 220 to track the first control signal $S_{CTRL1}$, thereby transmitting information from control unit 206 to the sensors as a modulated output voltage. The closed control loop 216 can also 216 receive a modulated sensor current signal by way of path 226, thereby receiving information from the sensors as a modulated current. It will be appreciated that the sensor interface module 202 can be operated in a half duplex mode such that the reception and transmission are done at different times.

A protocol processor 228, in communication with the closed control loop 216 and the reference voltage source 214, is configured to detect one or more properties of the exchanged data signals (e.g., slew rate, quantity proportional to out-of-band energy, etc.). The protocol processor 228 provides the detected properties to an impedance controller 230. If impedance controller 230 determines that a change in the value of the impedance element 224 would change the one or more properties in a manner that would improve performance of the interface module 202, it adjusts the value of the impedance element 224 based upon the one or more detected properties. In other words, impedance controller 230 operates as part of a feedback loop that dynamically changes the impedance of the impedance element 224 based upon one or more properties of exchanged data signals in a manner that adjusts the one or more properties to improve performance of the sensor interface module 202.

For example, in some embodiments, the protocol processor 228 provides one or more properties of an exchanged data signal to impedance controller 230, which comprises a comparator 232. The comparator 232 is configured to determine if the one or more detected properties violate a performance indicator that is indicative of an undesirable performance level. If the properties indicate an undesirable performance level, impedance controller 230 is configured to generate a second control signal $S_{CTRL2}$, which selectively varies the value of the impedance element 224 in a manner that adjust the one or more properties to improve performance of the sensor interface module 202.

It will be appreciated that although FIG. 2 illustrates certain elements as being comprised within other elements, such element locations in ECU architecture 200 are non-limiting. For example, although protocol processor 228 is shown as being within control unit 206, it may alternatively be comprised within interface module 202 or comprise a component separate from both control unit 206 and interface module 202.

Figure 3:
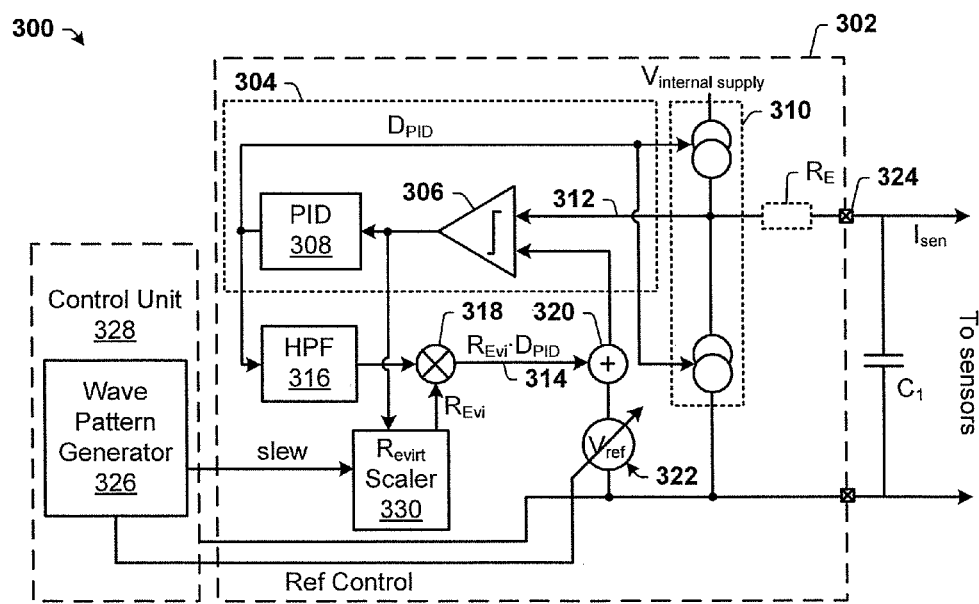
FIG. 3 is a block diagram of a sensor interface module configured to vary a virtual resistance based upon the slew rate of a modulated wave pattern.

FIG. 3 illustrates a block diagram of a more detailed embodiment of an ECU architecture 300 having a sensor interface module 302 configured to vary a virtual resistance based upon a slew rate of a modulated wave pattern.

Sensor interface module 302 comprises a closed control loop 304 having a first feedback path 312 that helps to tune the voltage at output node 324 to a reference voltage $V_{ref}$. The sensor interface module 302 further includes a second feedback path 314 that facilitates a virtual resistance functionality (shown as element $R_E$), which emulates an inner impedance of the voltage source. This impedance can be designed to attenuate the line resonance and avoid a DC voltage drop due to the sensor supply current $I_{sen}$ as it would appear with a physical resistor in the current path.

In particular, the first feedback path 312 comprises comparison element 306 (e.g., a comparator, an analog-to-digital converter) having a first input coupled to a summation element 320 and a second input coupled to output node 324. An output of the comparison element 306 is coupled to a PID controller 308. An output of the PID controller 308 is, in turn, coupled to an output driver stage 310 having first and second digitally controlled current sources.

The summation element 320 is configured to output an adjusted reference voltage controlled by a wave pattern generator 326. The wave pattern generator 326 provides a modulated wave pattern, corresponding to signals that are to be sent to one or more sensors, to a reference voltage source 322 that changes the reference voltage $V_{ref}$ based upon the modulated wave pattern. Based upon the adjusted reference voltage, the comparison element 306 adjusts a digital signal $D_{PID}$ output by the PID controller 308 until the voltage at output node 324 matches the adjusted reference signal. Therefore, the wave pattern generator 326 can transmit a modulated output voltage to a sensor by varying the reference voltage between a low and a high supply voltage.

Second feedback path 314 includes a high pass filter 316, a multiplier 318, and the summation element 320, which are operably coupled as shown. The digital output signal $D_{PID}$ is provided from PID controller 308 to the high pass filter 316. The high pass filter 316 is configured to attenuate frequencies which are below a frequency range of interest for the data transmission (e.g., if data is to be transmitted in a frequency band between 100 KHz and 2 MHz, high pass filter 316 only passes frequencies of 10 kHz or greater). In order to get the voltage drop that would be caused by an actual resistor, the multiplier 318 multiplies the output of high pass filter 316 (which is directly proportional to the current at output node 324) with a virtual resistance value $R_{Evi}$ (that defines the resistance of the emulated resistor) to generate a multiplied signal ($R_{Evi} \cdot D_{PID}$). Summation element 320 subtracts the multiplied signal from the reference voltage provided by reference voltage source 322. As a result of the virtual resistance, the voltage at output node 324 decreases proportionally with the current consumption of the load—as it would do if a real resistor were inserted in the current path.

The virtual resistor $R_E$ and a capacitor $C_1$ form an RLC network having a time constant that limits the speed of changes in the modulated output voltage at output node 324 (i.e., the RLC network will filter voltage edges, limiting the slew rate of the output voltage). By limiting the speed of changes in the modulated output voltage at output node 324, the achievable data rate of exchanged data signals is also limited.

To prevent limiting the speed of changes in the modulated voltage, a scaling element 330 is configured to receive a first time derivative of the modulated wave pattern (i.e., a slew rate), used to transmit data to one or more sensors, from the wave pattern generator 326. Since the sensor interface module 302 generates the modulated output voltage based on the modulated wave pattern, scaling element 330 can analyze the slew rate of the modulated wave pattern and scale the virtual resistor $R_E$ in a manner that follows the modulated wave pattern. By scaling the virtual resistor $R_E$, the RC time constant is changed to provide for a higher slew rate than can be achieved by keeping virtual resistor $R_E$ constant. For example, if the slew rate of the modulated wave pattern is above an achievable time constant, the scaling element 330 reduces the resistance of virtual resistor $R_E$ by multiplying the virtual resistance value $R_{Evi}$ with a scaling factor that is smaller than one.

Figures 4A, 4B:
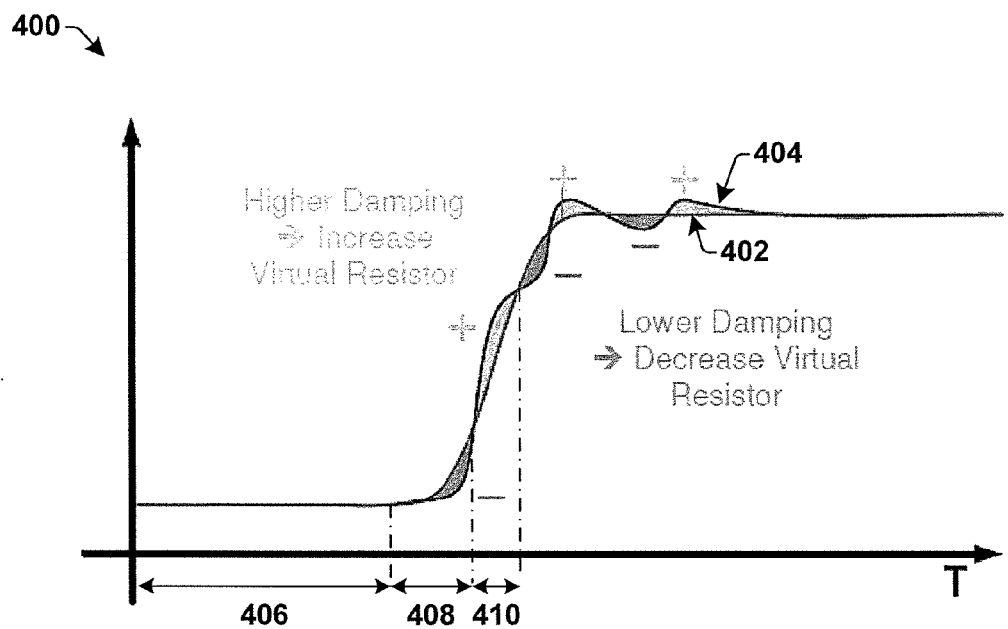

FIG. 4a is a graph 400 showing how varying the resistance of virtual resistor $R_E$ (i.e., slew rate enhancement) changes the modulated output voltage of an interface module compared to a reference voltage value. As shown in graph 400, the reference voltage set by wave pattern generator 326 is represented by line 402 and the modulated output voltage of the interface module 302 is represented by line 404.

If the slew rate of the modulated output voltage 404 is below or above the slew rate of the reference voltage 402, scaling element 330 takes action to change the value of the virtual resistor $R_E$. For example, during a first time period 406, the reference voltage 402 is constant and the scaling element 330 takes no action. During a second time period 408, the reference voltage 402 starts to increase causing the closed control loop to generate a modulated output voltage 404 that follows the reference voltage 402. However, there is a delay between the modulated output voltage 404 and the reference voltage 402, which causes the modulated output voltage 404 to stay below the reference voltage 402 (i.e., causes the feedback signal to be negative; Vref>Vout). Since the slew rate of the reference voltage 402 is higher than the slew rate of the modulated output voltage 404, scaling element 330 reduces the value of the virtual resistor $R_E$. Reducing the value of the virtual resistor $R_E$ causes the slew rate of the modulated output voltage 404 to increase so that the modulated output voltage 404 can more quickly follow the reference voltage 402.

Since there is a time delay between the modulated output voltage 404 and the reference voltage 402, overshoot and oscillator may occur around reference voltage 402. Such oscillations are made worse since damping of the resonance caused by the line inductance together with the blocking capacitors on ECU and sensor side are reduced with a reduction of the virtual resistor, which is an unwanted side effect and could lead to oscillation. If such oscillations occur the modulated output voltage 404 will exceed the reference voltage 402 causing the feedback signal to change to positive; Vref<Vout. For example, during a third time period 410, the modulated output voltage 404 exceeds the reference voltage 402.

To avoid such overshoot, scaling element 330 can increase value of the virtual resistor $R_E$ if the feedback from the comparison element 306 is not pointing it to the same direction as the slew signal. For example, if slewing is positive and the modulated output voltage 404 is higher than the reference voltage 402 then scaling element 330 increases the value of the virtual resistor $R_E$. However, if slewing is positive and modulated output voltage 404 is lower than the reference voltage 402 then scaling element 330 decreases the value of the virtual resistor $R_E$. The same mechanism is applied during falling edges of the reference voltage with inverse reactions depending on the feedback. The states and resulting reactions of the mechanism are summarized in table 412 shown in FIG. 4b.

Figure 5A:
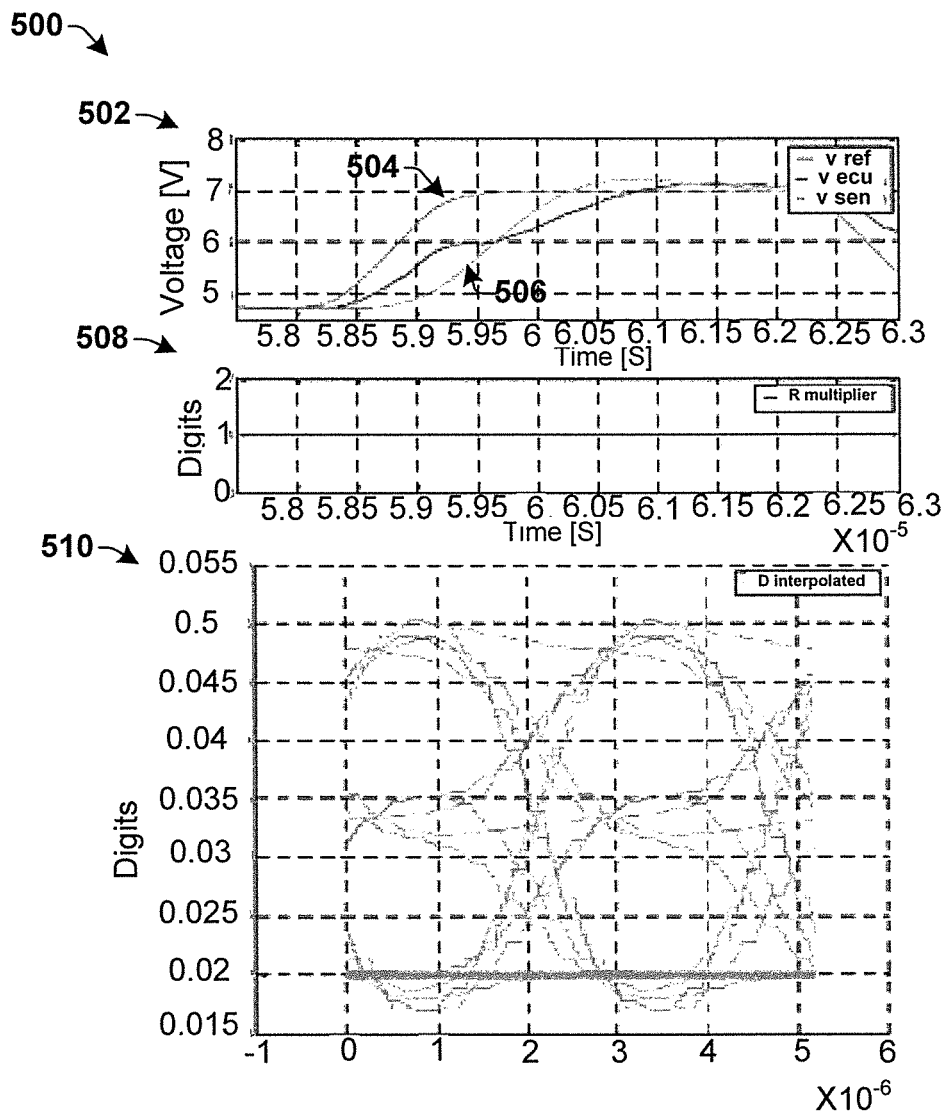
FIGS. 5a-5c are signal diagrams showing how slew rate enhancement increases the quality of modulated output voltage signals.
Figure 5B:
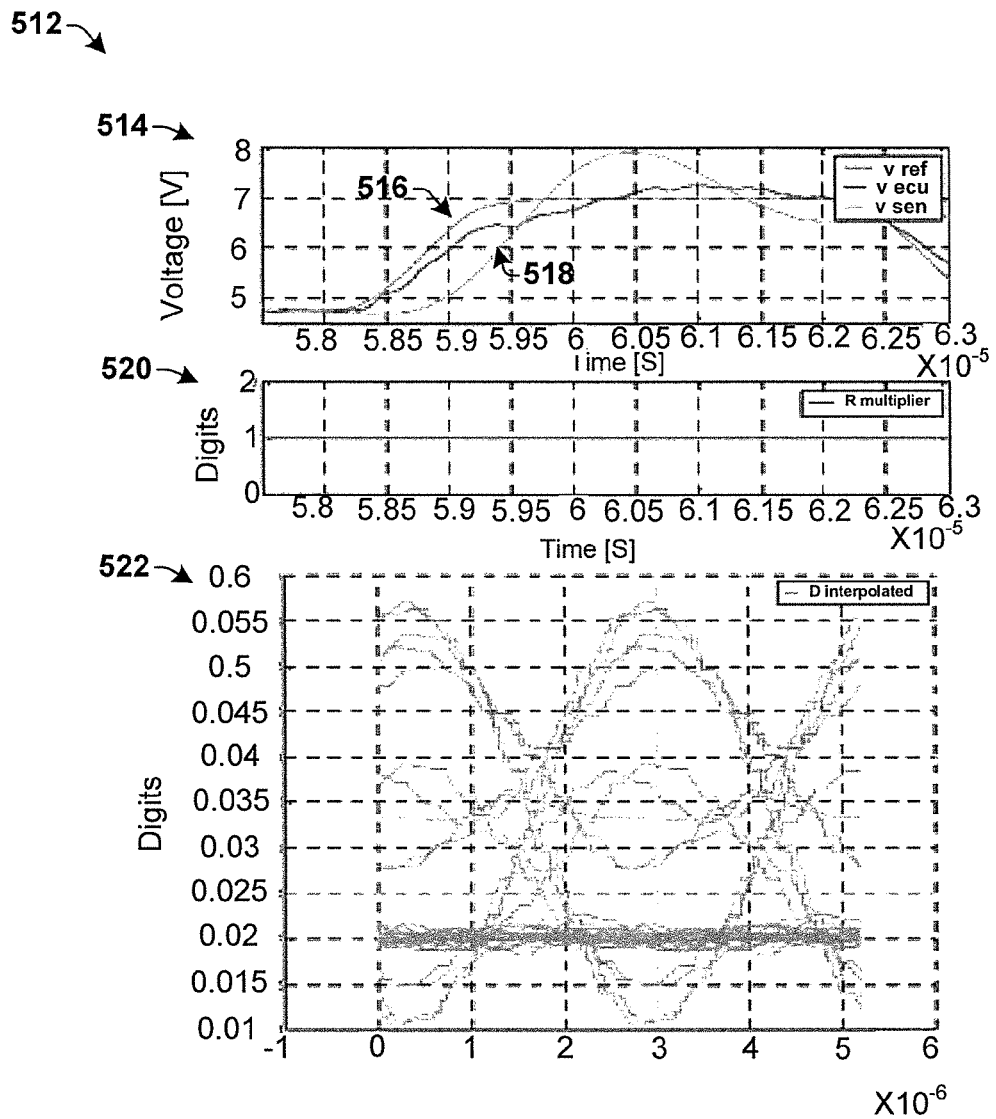
Figure 5C:
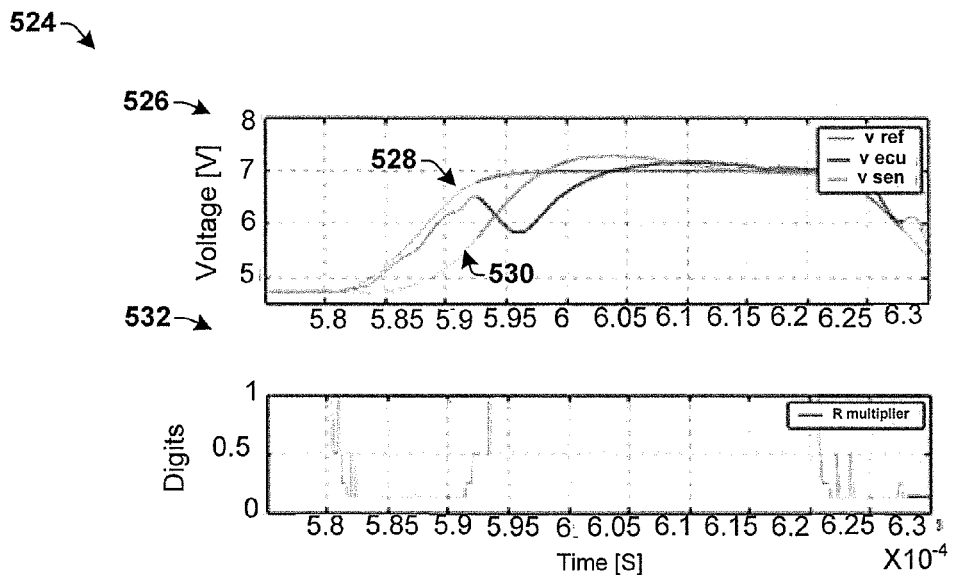

FIGS. 5a-5c are signal diagrams showing how slew rate enhancement increases the quality of modulated out voltage signals.

FIG. 5a illustrates signal diagrams 500 generated using an impedance element having a non-variable resistance value of 8 ohms. As shown in graph 508, the virtual resistance value $R_{Evi}$ is multiplied with a constant scaling factor having a value equal to 1. Graph 502 shows a smooth settling of the sensor supply voltage 506 (i.e., the modulated output voltage received at a sensor) with a low overshoot of 300 mV with respect to the reference voltage 504. An associated eye diagram 510 has a wide opening that indicates that demodulation is possible with a high safety margin. However, the settling of the supply voltage 506 is slow (e.g., approximately 3 microseconds) and the signal is significantly delayed from reaching the sensor, preventing high speed transmission of data.

FIG. 5b illustrates signal diagrams 512 generated using an impedance element having a non-variable resistance value of 2 ohms. As shown in graph 520, the virtual resistance value $R_{Evi}$ is multiplied with a constant scaling factor having a value equal to 1. Graph 514 shows a fast settling of the sensor supply voltage 518. However, the sensor supply voltage 518 has a large overshoot of 1V with respect to the reference voltage 516. Furthermore, an associated eye diagram 522 has eye openings that are significantly reduced due to oscillations caused by insufficiently damped line resonance.

FIG. 5c illustrates a signal diagram 524 generated using an impedance element having adaptive slew rate enhancement. As shown in graph 532, the scaling factor, which scales the virtual resistance value $R_{Evi}$, varies between 0 and 1 to provide slew rate enhancement. In particular, the slew rate enhancement is activated to adjust a value of the impedance element during a voltage modulation edge (e.g., from approximately 5.8 to 5.95 mS) and is deactivated to adjust the value of the impedance element during constant periods of the voltage modulation phase (e.g., from approximately 5.95 to 6.2 mS).

Signal diagram 526 show a smooth settling of the sensor supply voltage 530 with a settling time that is almost as fast as for 2 ohms (graph 514). The fast settling time is due to reduction in the virtual resistance to reach to 2 ohm caused by slew rate enhancement. Sensor supply voltage 530 also has a low overshoot of 300 mV with respect to the reference voltage

528. The low overshoot is due to an increase in the virtual resistance to reach 8 ohms caused by slew rate enhancement. Accordingly, the disclosed slew rate enhancement combines the advantage of fast settling with a low ohmic output with the advantage of good damping of the line resonance.

Figure 6:
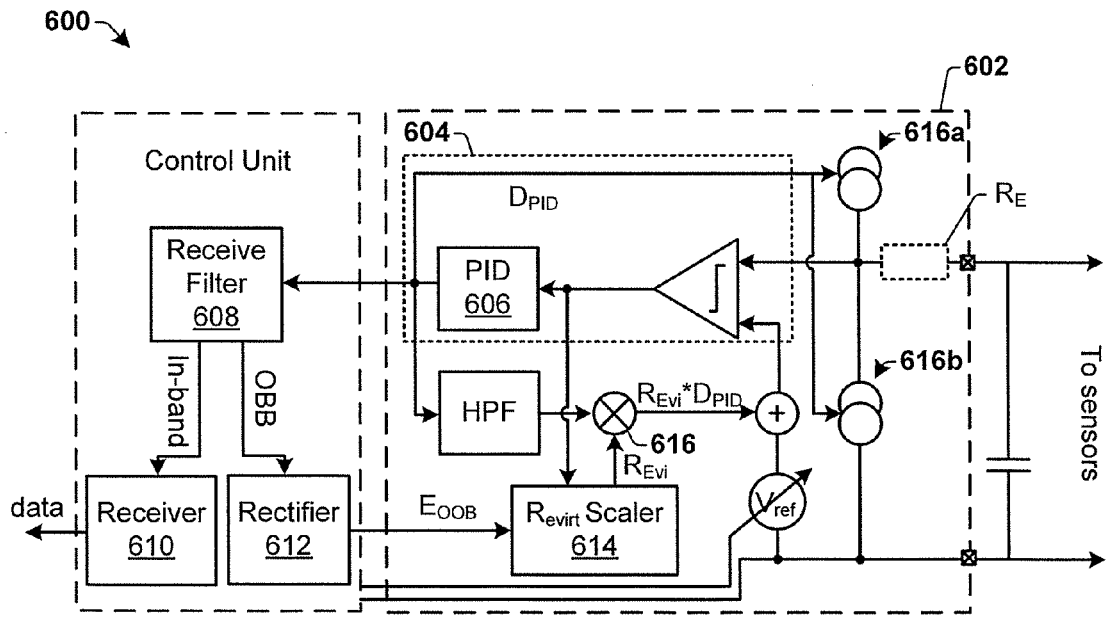
FIG. 6 is a block diagram of a sensor interface module configured to vary a virtual resistance based upon out-of band energy of a modulated sensor current signal.

FIG. 6 illustrates a block diagram of an ECU architecture 600 having a sensor interface module 602 configured to vary a virtual resistance based upon an out-of-band energy of modulated sensor current signals received from one or more sensors.

Sensor interface module 602 comprises a closed control loop 604 having a PID controller 606 configured to output a digital data signal $D_{PID}$ proportional to the output current of the interface module 602. Digital data signal $D_{PID}$ comprises received current having the received current modulated sensor signals along with other reactions of the PID controller, which can be caused by external distortions like EMI (Electromagnetic injection) or reflections on a bus line.

The digital data signal $D_{PID}$ is output from PID controller 606 to a receive filter 608. The receive filter 608 is configured to separate out-of-band components of received current from in-band components comprising received current modulated sensor signals transmitted from one or more sensors. In some embodiments, the receive filter 608 may comprise a low-pass filter configured to remove out-of-band components from the received current signals (i.e., to remove frequency bands not used for transmission of data). The in-band components are provided to a receiver 610 configured to demodulate the received current modulated signals to recover data transmitted from the one or more sensors.

The out-of-band signals, which represent signal components not belonging to current modulated sensor signals, are provided to a rectifier 612 configured to calculate a quantity that is proportional (e.g., linearly or nonlinearly proportional) to the energy of the out-of-band components $E_{OOB}$ (e.g., by rectifying the out-of-band signals using a squarer function and then averaging the rectified signal, by removing the sign of the out-of-band signals to get a quantity that is proportional to the energy, etc.). The quantity $E_{OOB}$ is provided to a scaling element 614, which evaluates quantity and based thereupon selectively adjusts the value of the virtual resistor $R_E$. In some embodiments, the scaling element 614 compares the quantity to a predetermined threshold value. If the quantity (e.g., the out-of-band energy) exceeds the predetermined threshold value, the value of the virtual resistor $R_E$ can be increased to limit the current that can be delivered to the interface module to counteract the EMI and ensure that the controller is not reacting on out-of-band energy.

For example, during EMI the current that is injected into the output can increase to values which are much higher than the normal operating current of the sensors. Since the voltage drop across the low side current source 616*b* is the output voltage for the sensor supply (typically between 4V and 15V), which is much higher than the voltage drop across the high side current source 616*a* (typically between 1V and 3V) the power consumption of the interface module increases due to the power consumption on the low side current source 616*b*, which is almost negligible during normal operation, becoming a factor between 2 and 15 higher than the one on the high side. The temperature increase during EMI of the device is proportional to both factors.

In order to avoid an increase in the size of the low side current source 616*b* to prevent overheating, the change in the value of virtual resistor $R_E$ limits the current consumption. The change of the value of virtual resistor creates a proportional decrease of the current from high and low side current sources and therefore limits demodulation effects to an acceptable level that still allows a recognition of the current modulated sensor signal after the receive filter 608.

Figures 7A, 7B:
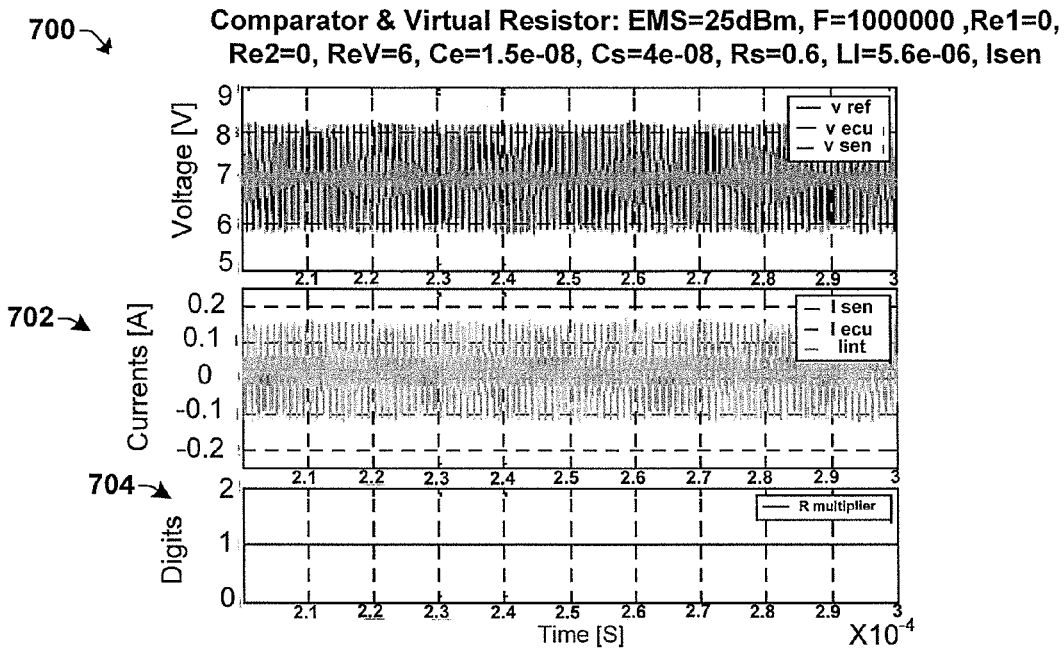
FIGS. 7a-7b are signal diagrams showing how varying a resistance based upon out-of band energy of a modulated sensor current signal reduces power consumption of the transmitter during electromagnetic injection into the connected wiring network.

FIGS. 7*a*-7*b* are signal diagrams showing how varying an output resistance based upon out-of band energy of a modulated sensor current signal reduces power consumption of the transmitter during electromagnetic injection into the connected wiring network.

FIG. 7*a* shows signal diagrams 700 corresponding to an ECU system that does not have the disclosed the disclosed adaptive output resistance for EMC rejection (i.e., the EMC rejection mechanism). As shown in graph 704, the virtual resistance value $R_{Evi}$ is multiplied with a constant scaling factor having a value equal to 1. Graph 702 shows the current level output from the interface, which ranges from −100 mA to 150 mA.

FIG. 7*b* shows signal diagrams 706 corresponding to an ECU system with the disclosed EMC rejection mechanism. As shown in graph 710, the virtual resistance value $R_{Evi}$ changes as a scaling factor varies between 2.5 and 3.5, to increase the virtual resistance, depending on out-of-band energy. Referring to graph 708, the resulting low side current (shown by negative current values) is reduced to −50 mA to 100 mA (i.e., reduced by a factor of 2 relative to graph 702). Therefore, the adaptive output resistance significantly reduces power consumption due to the drop in current (especially negative current).

By changing the value of the virtual resistor $R_E$ in response to out-of-band energy oscillations due to the LC resonance of the transmission line can also be decreased at a faster rate.

Figure 8A:
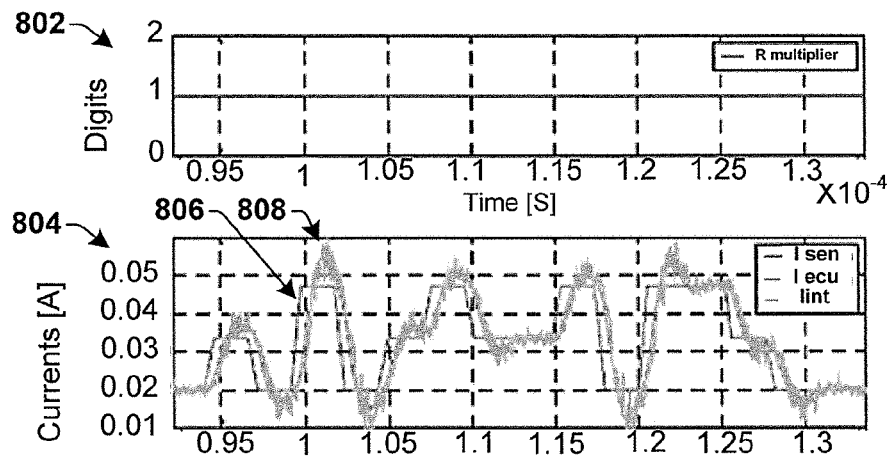
FIGS. 8a-8b are signal diagrams showing how varying a resistance based upon out-of band energy of a modulated sensor current signal reduces oscillations.
Figure 8B:
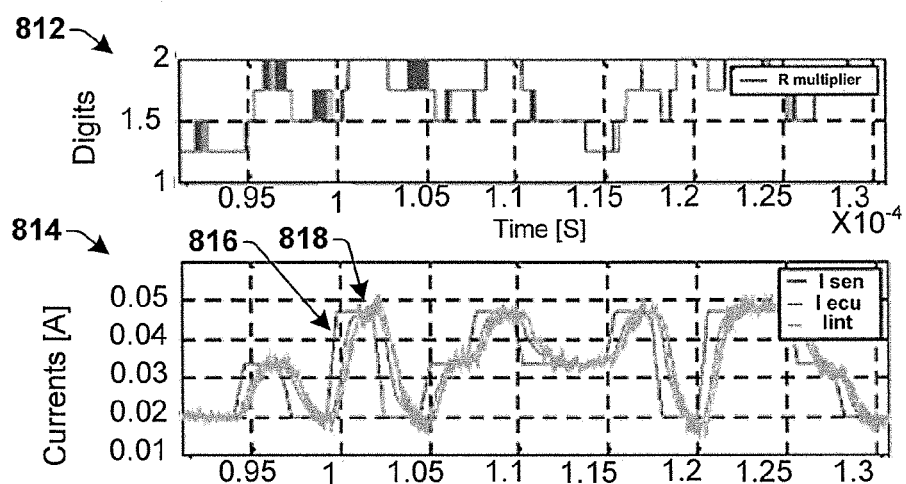

FIGS. 8*a*-8*b* are signal diagrams showing how varying a resistance based upon out-of band energy of a modulated sensor current signal reduces oscillations caused by stimulation of LC resonances of the sensor bus by the edges of the sensors supply current modulation during data transmission.

FIG. 8*a* shows signal diagrams 800 corresponding to an ECU system that does not have the disclosed EMC rejection mechanism. As shown in graph 802, the virtual resistance value $R_{Evi}$ is multiplied with a constant scaling factor having a value equal to 1. Graph 804 shows the current modulated sensor signals output from the sensors as line 806, and the current signals received by the ECU as line 808. Without varying virtual resistance value to attenuate oscillations, the current signals received by the ECU (line 808) have a significant overshoot, since line 808 goes above and below line 806.

FIG. 8*b* shows signal diagrams 810 corresponding to an ECU system with the disclosed EMC rejection mechanism. Graph 812 illustrates a scaling factor, which scales the virtual resistance value $R_{Evi}$, while graph 814 shows the current modulated sensor signals output from the sensors as line 816 and the current received by the ECU as line 818.

As shown in graph 812, the scaling factor increases to values varying between 1.25 and 2 after an edge in the current modulated sensor signals output from the sensors (line 816) appears. The virtual scaling factor decreases to lower values when the new current for a sensor is settled. By increasing the scaling factor for $R_{Evi}$ at the point where the current signals received by the ECU (line 814) exceed a certain level of out-of-band energy, the virtual resistance is automatically increased and stop overshoot. This avoids a reduction of the steepness of the current edges that are delivered by the control loop.

Figure 9:
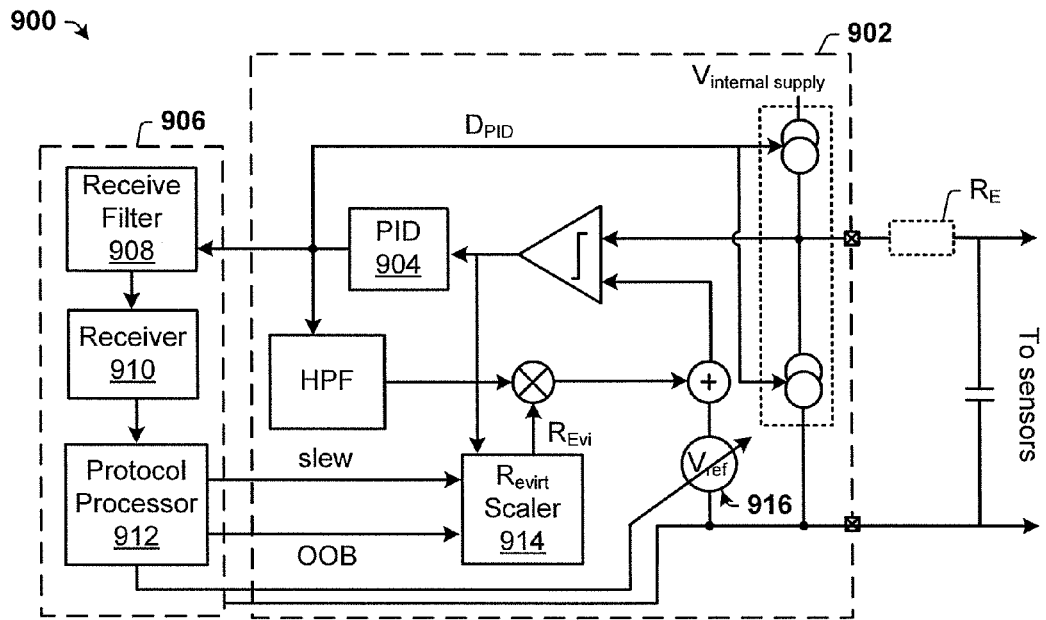
FIG. 9 is a block diagram of a sensor interface module configured to vary a virtual resistance based upon slew rate and out-of-band energy.

FIG. 9 illustrates a block diagram of some alternative embodiments of an ECU architecture 900 having an interface module 902 configured implement slew rate enhancement and out-of-band EMC rejection.

The interface module 902 comprises a receive filter 908 configured to receive a digital output signal $D_{PID}$ from a PID controller 904. The receive filter 908 filters the digital output signal $D_{PID}$ to separate out-of-band components from in-band components corresponding to the current modulated sensor signals received from the one or more sensors. In some embodiments, the receive filter 908 provides the in-band and out-of-band components to a receiver 910, which further provides out-of-band components to protocol processor 912. In other embodiments, the receive filter 908 provides the in-band to receiver 910 and out-of-band components directly to protocol processor 912.

The protocol processor 912 is configured to control the output voltage of the interface module 902, by controlling the reference voltage of reference voltage source 916. The protocol processor 912 is further configured to calculate a quantity that is proportional to an out-of-band energy for a received current signals and a slew rate of an output voltage signal. The slew rate and/or quantity are then provided to a scaling element 914, which generates a scaling factor for the virtual resistance value $R_{Evi}$, which is used to scale the effect of the virtual resistor $R_E$. The virtual resistance value comprises a digital value (e.g., a 16-bit digital value), which can be adjusted to increase or decrease value of the virtual resistor $R_E$ in response to the slew rate and/or quantity. For example, for a quantity indicating a high out-of-band signal energy the scaling element 914 is configured to increase the resistance of virtual resistor $R_E$ by using a scaling factor larger than one, while for a high slew rate the scaling element 914 is configured to decrease the resistance of virtual resistor $R_E$ by using a scaling factor smaller than one.

Figure 10:
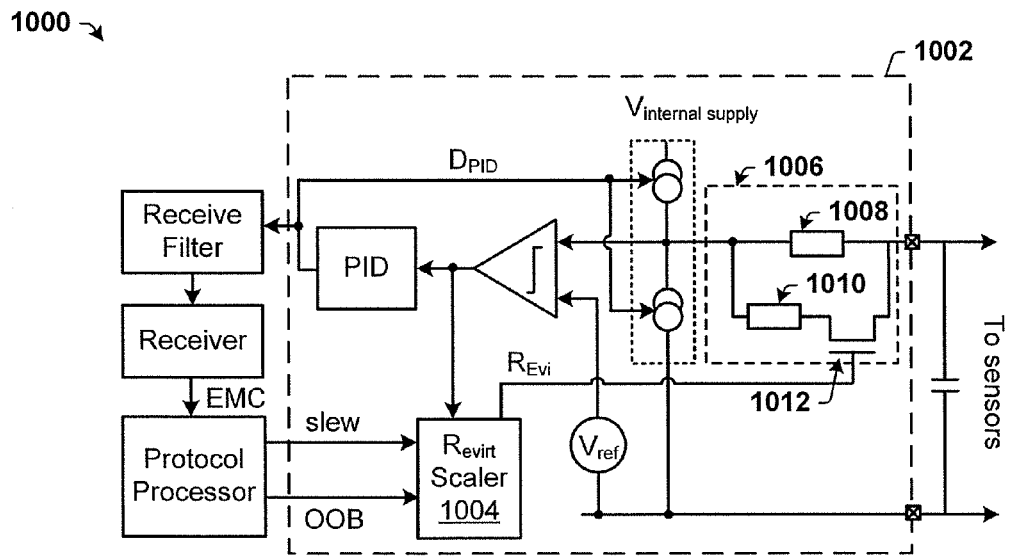
FIG. 10 is a block diagram of a block diagram of a sensor interface module having a physical resistive element.

FIG. 10 illustrates a block diagram of an ECU architecture 1000 having interface module 1002 with a physical, scalable resistive element 1006 configured to vary depending on one or more parameters of data signals exchanged between an ECU and sensors.

Interface module 1002 comprises a scalable resistive element 1006. The scalable resistive element 1006 comprises a first signal path having a first resistor 1008 which sets the maximum value. The first signal path is configured in parallel with a second signal path having a second resistor 1010. The scaling element 1004 is configured to generate a control signal that activates a switching element 1012 (e.g., a MOS switch) configured to selectively place the first and second resistors, 1008 and 1010, in parallel. When the switching element 1012 is turned off the resistance of the scalable resistive element 1006 is equal to that of resistor 1008. When the switching element 1012 is turned on, placing the first and second resistors in parallel, the resistance of the scalable resistive element 1006 is below that of the first and second resistors, 1008 and 1010.

For example, to change between a 2 ohm setting and an 8 ohm setting, the first resistor would comprise an 8 ohm resistor and the second resistor would comprise a 2.67 ohm resistor. By turning the second resistor on or off, the resistance of the resistive element would change between 8 ohm and 2 ohms. To achieve a value between 2 and 8 ohms (e.g., 5 ohm) the system may perform time multiplexing (e.g., activate parallel path with duty cycle of 50%).

Figure 11:
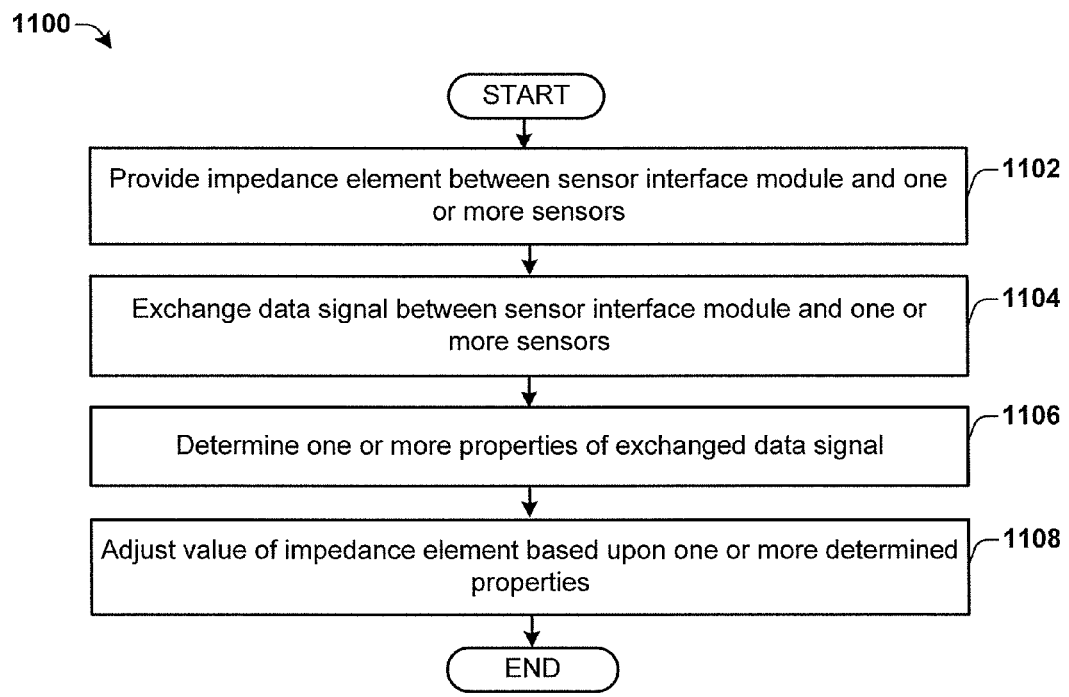
FIG. 11 is a flow diagram of an exemplary method of improving performance of a sensor interface module in an ECU architecture.

FIG. 11 is a flow diagram of an exemplary method 1100 of improving performance of a sensor interface module in an ECU architecture.

It will be appreciated that while method 1100 is illustrated and described below as a series of acts or events, the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

Furthermore, the disclosed methods may be implemented as a apparatus, or article of manufacture using standard programming and/or engineering techniques to produce software, firmware, hardware, or any combination thereof to control a computer to implement the disclosed subject matter (e.g., the circuits shown in FIG. 2, 3, etc., are non-limiting examples of circuits that may be used to implement the disclosed methods). The term "article of manufacture" as used herein is intended to encompass a computer program accessible from any computer-readable device, carrier, or media. Of course, those skilled in the art will recognize many modifications may be made to this At 1102 the method provides an impedance element between a sensor interface module and one or more sensors. In various embodiments, the impedance element may comprise a physical resistor or a virtual resistor as well as filters that define a frequency dependent behavior of the impedance that is emulated.

At 1104 the method exchanges a data signal between the sensor interface module and the one or more sensors. In some embodiments, the data signals may comprise a modulated output voltage provided from the sensor interface module to one or more sensors or a modulated sensor current signal received by the sensor interface module from the one or more sensors.

At 1106 the method determines one or more properties of an exchanged data signal. In some embodiments, the one or more properties may comprise a slew rate of the modulated output voltage or a quantity that is proportional to an out-of-band energy of a modulated sensor current signal received from one or more sensors.

At 1108 a value of the impedance element is selectively adjusted based on the one or determined properties. In some embodiments, a value of the impedance element is adjusted if the detected one or more properties violate a performance indicator. For example, in one embodiment, wherein the modulated output voltage is generated based upon a modulated reference voltage the value of the impedance element is adjusted if the slew rate of the modulated voltage signal is below a slew rate of a reference voltage. In another embodiment, the value of the impedance element is adjusted if the quantity that is proportional to the out-of-band energy is above a predetermined value.

Although the disclosure has been shown and described with respect to one or more implementations, equivalent alterations and modifications will occur to others skilled in the art based upon a reading and understanding of this specification and the annexed drawings Further, it will be appreciated that identifiers such as "first" and "second" do not imply any type of ordering or placement with respect to other elements; but rather "first" and "second" and other similar identifiers are just generic identifiers. In addition, it will be appreciated that the term "coupled" includes direct and indirect coupling. The disclosure includes all such modifications and alterations and is limited only by the scope of the following claims. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. In addition, the articles "a" and "an" as used in this application and the appended claims are to be construed to mean "one or more".

Furthermore, to the extent that the terms "includes", "having", "has", "with", or variants thereof are used in either the detailed description or the claims, such terms are intended to be inclusive in a manner similar to the term "comprising."

What is claimed is:

1. A control unit, comprising:
    a sensor interface module configured to output a modulated output voltage to one or more sensors and to receive a modulated sensor current signal from the one or more sensors;
    an RLC network comprising an impedance element, which is located between the sensor interface module and the one or more sensors;
    a protocol processor configured to detect one or more properties of the modulated output voltage or the modulated sensor current signals; and
    an impedance controller configured to selectively adjust a value of the impedance element based upon the one or more properties to improve performance of the control unit.

2. The control unit of claim 1, wherein the impedance controller comprises:
    a comparison element configured to generate a control signal if one of the one or more properties violates a performance indicator, wherein the control signal selectively varies the value of the impedance element in a manner that adjust the one property so that the one property does not violate the performance indicator.

3. The control unit of claim 1, wherein the sensor interface module comprises:
    a reference voltage source configured to output a modulated reference signal;
    a comparator having a first comparator input connected to the reference voltage source, a second comparator input, and a comparator output;
    a PID controller comprising a PID input and a PID output, wherein the PID input is coupled to the comparator output and the PID output is coupled to a control terminal of an output driver stage that is configured to provide the modulated output voltage at an output node of the output driver stage; and
    a first feedback path coupling the output node of the output driver stage to the second comparator input;
    wherein the comparator is configured to operate the PID controller to adjust the output of the output driver stage until the modulated output voltage follows the modulated reference signal.

4. The control unit of claim 3, wherein the protocol processor comprises:
    a wave pattern generator configured to generate a modulated wave pattern that controls the modulated reference signal, and to provide a property comprising a slew rate of the modulated wave pattern to the impedance controller.

5. The control unit of claim 4, wherein the impedance controller adjusts a value of the impedance element if a slew rate of the modulated output voltage is below or above the slew rate of the modulated wave pattern, thereby changing an time constant of the RLC network to change the slew rate of the modulated output voltage.

6. The control unit of claim 4, wherein the impedance controller is activated to adjust a value of the impedance element during a voltage modulation phase that transmits data to the one or more sensors and is deactivated to adjust the value of the impedance element during a current modulated phase that receives data from the one or more sensors.

7. The control unit of claim 3, wherein the protocol processor comprises:
    a receive filter coupled to the PID output and configured to separate the modulated sensor current signal into in-band signal components and out-of-band signal components; and
    a rectifier configured to receive the out-of-band signal components from the receive filter and to determine a quantity that is proportional to an energy of the out-of-band signal components, which is provided as a property to the impedance controller.

8. The control unit of claim 7, wherein a value of the impedance element is increased if the quantity is greater than a predetermined value.

9. The control unit of claim 7, wherein the impedance element comprises a virtual resistor, comprising:
    a summation element having a first summation input coupled to the reference voltage source, a second summation input, and a summation output coupled to the second comparator input;
    a second feedback path coupling the comparator output to the second summation input; and
    a multiplier disposed on the second feedback path, wherein the multiplier is configured to provide a multiplied signal to the second summation input based on a multiplication of a signal on the first feedback path with a virtual resistance value.

10. The control unit of claim 1, wherein the impedance element comprises a physical resistive element comprising:
    a first signal path having a first resistor;
    a second signal path in parallel with the first signal path and having a second resistor; and
    a switching element configured to selectively place the first resistor in parallel with the second resistor.

11. A control unit, comprising:
    a reference voltage source configured to provide a modulated reference signal;
    a closed control loop configured to drive an output driver stage to provide a modulated output voltage, which tracks the modulated reference signal, to an output node and to receive a modulated sensor current signal from one or more sensors;
    an RLC network comprising a virtual resistor located between the output driver stage and the one or more sensors;
    a protocol processor in communication with the closed control loop and the reference voltage source, which is configured to provide a slew rate of the modulated reference signal or out-of-band energy of the modulated sensor current signal to a protocol processor output; and
    an impedance controller coupled to the protocol processor output and configured to dynamically adjust a value of the virtual resistor if the slew rate or the out-of-band energy violate a performance indicator.

12. The control unit of claim 11, wherein the protocol processor comprises:
    a wave pattern generator configured to generate a modulated wave pattern that controls the modulated reference signal, and to provide a slew rate of the modulated wave pattern to the impedance controller.

13. The control unit of claim 12, wherein the impedance controller adjusts a value of the virtual resistor if a slew rate of the modulated output voltage is below or above the slew rate of the modulated wave pattern, thereby changing a time constant of the RLC network to change the slew rate of the modulated output voltage.

14. The control unit of claim 11, wherein closed control loop comprises:
   a comparator having a first comparator input connected to the reference voltage source, a second comparator input, and a comparator output;
   a PID controller comprising a PID input and a PID output, wherein the PID input is coupled to the comparator output and the PID output is coupled to a control terminal of an output driver stage that is configured to provide the modulated output voltage at an output node of the output driver stage; and
   a first feedback path coupling the output node of the output driver stage to the second comparator input;
   wherein the comparator is configured to operate the PID controller to adjust the output of the output driver stage until the modulated output voltage follows the modulated reference signal.

15. The control unit of claim 14, wherein the protocol processor comprises:
   a receive filter coupled to the PID output and configured to separate the modulated sensor current signal into in-band signal components and out-of-band signal components; and
   a rectifier configured to receive the out-of-band signal components from the receive filter, to determine a quantity that is proportional to an energy of the out-of-band signal components, and to provide the quantity to the impedance controller.

16. The control unit of claim 14, wherein the virtual resistor comprises:
   a summation element having a first summation input coupled to the reference voltage source, a second summation input, and a summation output coupled to the second comparator input;
   a second feedback path coupling the comparator output to the second summation input; and
   a multiplier disposed on the second feedback path, wherein the multiplier is configured to provide a multiplied signal to the second summation input based on a multiplication of a signal on the first feedback path with a virtual resistance value.

17. A method of improving performance of a sensor interface module in a control unit architecture:
   providing an impedance element between a sensor interface module and one or more sensors;
   exchanging a data signal between the sensor interface module and the one or more sensors;
   determining one or more properties of the exchanged data signal; and
   selectively adjusting a value of the impedance element based upon the one or more properties.

18. The method of claim 17, wherein one or more properties comprise a slew rate of a modulated output voltage provided from the sensor interface module to the one or more sensors or a quantity that is proportional to an out-of-band energy of a modulated sensor current signal received from the one or more sensors.

19. The method of claim 18, further comprising:
   generating the modulated output voltage based upon a modulated reference voltage; and
   adjusting the value of the impedance element if the slew rate of the modulated output voltage is below a slew rate of the modulated reference voltage.

20. The method of claim 18, wherein the value of the impedance element is adjusted if the quantity is above a predetermined value.

* * * * *